(12) United States Patent
Takahashi

(10) Patent No.: US 11,752,717 B2
(45) Date of Patent: Sep. 12, 2023

(54) TIRE VULCANIZATION DEVICE AND METHOD

(71) Applicant: The Yokohama Rubber Co., LTD., Tokyo (JP)

(72) Inventor: Yukihisa Takahashi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 17/597,980

(22) PCT Filed: Jul. 1, 2020

(86) PCT No.: PCT/JP2020/025770
§ 371 (c)(1),
(2) Date: Jan. 31, 2022

(87) PCT Pub. No.: WO2021/024651
PCT Pub. Date: Feb. 11, 2021

(65) Prior Publication Data
US 2022/0314563 A1    Oct. 6, 2022

(30) Foreign Application Priority Data

Aug. 5, 2019 (JP) ................ 2019-143799

(51) Int. Cl.
*B29D 30/06* (2006.01)
*B30B 1/32* (2006.01)
*B30B 1/40* (2006.01)

(52) U.S. Cl.
CPC ............ *B29D 30/0605* (2013.01); *B30B 1/32* (2013.01); *B30B 1/40* (2013.01); *B29D 2030/0609* (2013.01)

(58) Field of Classification Search
CPC ........ B29D 30/0605; B29D 2030/0609; B30B 1/32; B30B 1/40
(Continued)

(56) References Cited

U.S. PATENT DOCUMENTS

| | | | | |
|---|---|---|---|---|
| 3,396,221 | A | * | 8/1968 | Musch ............... B29D 30/0605 264/315 |
| 6,345,970 | B1 | * | 2/2002 | Mitamura ............... F15B 11/17 425/451.9 |
| 2009/0008024 | A1 | * | 1/2009 | Marchini ........... B29D 30/0661 425/38 |

FOREIGN PATENT DOCUMENTS

| | | |
|---|---|---|
| JP | S63-054212 A | 3/1988 |
| JP | 2010-42557 A | 2/2010 |

(Continued)

*Primary Examiner* — Matthew J Daniels
*Assistant Examiner* — Gregory C. Grosso
(74) *Attorney, Agent, or Firm* — THORPE NORTH & WESTERN

(57) ABSTRACT

Provided are a tire vulcanization device and a tire vulcanization method. A container ring is disposed on an outer circumferential side of segments mounted on outer circumferential surfaces of sector molds. A bolster plate is disposed above an upper plate mounted on an upper surface of an upper side mold. A green tire is placed in a sideways state on a lower side mold mounted on an upper surface of a lower plate. In a state where the bolster plate is moved downward by a pressurizing mechanism and maintained in a mold closed position, a container ring held slidably in a vertical direction with respect to the bolster plate by a connecting body is moved downward by pressurizing fluid supplied, and the sector molds are assembled in an annular shape to be closed with the upper side mold pressed against upper surfaces of the sector molds.

11 Claims, 7 Drawing Sheets

(58) Field of Classification Search
USPC .......................................................... 425/28.1
See application file for complete search history.

(56) References Cited

FOREIGN PATENT DOCUMENTS

| | | |
|---|---|---|
| JP | 2011-167916 A | 9/2011 |
| JP | 2011-194812 A | 10/2011 |

* cited by examiner

TIRE VULCANIZATION DEVICE AND METHOD

TECHNICAL FIELD

The present technology relates to a tire vulcanization device and a tire vulcanization method and particularly relates to a tire vulcanization device and a tire vulcanization method capable of more reliably closing a tire vulcanization mold and manufacturing a tire having excellent quality.

BACKGROUND ART

In manufacturing a tire, a green tire is vulcanized in a closed mold. The sectional type mold is composed of an upper side mold, a lower side mold, and a plurality of sector molds, and the molds are closed so as to be in close contact with each other (see, for example, Japan Unexamined Patent Publication No. S63-54212).

Each sector mold is pressed toward the center mechanism by a container ring that moves downward and is assembled in an annular shape. Each sector mold assembled in an annular shape and the lower side mold are assembled so as to be in close contact with each other. On the other hand, the upper side mold moves up and down together with an upper plate attached to the upper surface of the upper side mold. When the upper plate is placed below a bolster plate to which the container ring is attached, the upper surface of the upper plate is pressed downward by the bolster plate in a closed state of the mold.

When a gap occurs between the sector molds in the closed state of the mold, unvulcanized rubber of the green tire disposed lying sideways inside the mold flows out from the gap, which affects the quality of the vulcanized tire. Therefore, in the vulcanization device having this structure, it is necessary to press the sector molds more strongly by the container ring in order to prevent the occurrence of a gap between the sector molds. To achieve this, in closing the molds, the downward movement of the bolster plate needs to not be restricted by the upper plate, and pressing on each sector mold by the container ring is prioritized over pressing on the upper plate by the bolster plate.

Accordingly, a gap is likely to occur between the lower surface of the bolster plate and the upper surface of the upper plate. The larger the gap, the greater the amount of the upward movement of the upper side mold together with the upper plate when the green tire receives internal pressure during vulcanization, and a gap is created between the upper surface of each of the sector molds assembled in an annular shape and the lower surface of the upper side mold. In other words, the molds cannot be reliably maintained in a closed state without gaps. As a result, in the vulcanized tire, a step is formed on the upper side portion due to the gap between the upper surface of each of the sector molds and the lower surface of the upper side mold. There is room for improvement in improving the tire quality due to differences in the presence or absence of this step in the upper side portion and the lower side portion of the vulcanized tire.

SUMMARY

The present technology provides a tire vulcanization device and a tire vulcanization method capable of more reliably closing a tire vulcanization mold and manufacturing a tire having excellent quality.

A tire vulcanization device according to an embodiment of the present technology includes: segments respectively attached to an outer circumferential surface of each of a plurality of sector molds disposed in an annular shape; an upper plate attached to an upper surface of an upper side mold; a lower plate attached to a lower surface of a lower side mold; a container ring disposed on an outer circumferential side of the segments; a bolster plate disposed above the upper plate and connected to the container ring; and a pressurizing mechanism configured to move the bolster plate up and down. By moving the bolster plate downward, the sector molds are assembled in an annular shape between the upper plate and the lower plate, and the sector molds are closed while being vertically sandwiched between the upper side mold and the lower side mold. The tire vulcanization device includes: a connecting body interposed between the bolster plate and the container ring to connect the bolster plate and the container ring; and a fluid supply unit configured to supply pressurizing fluid. In a state where the container ring is held slidably in a vertical direction with respect to the bolster plate by the connecting body and a vertical position of the bolster plate is maintained in a mold closed position, by moving the container ring downward with respect to the bolster plate by the pressurizing fluid supplied by the fluid supply unit, the sector molds are assembled in an annular shape to be closed with the upper side mold pressed against upper surfaces of the sector molds.

A tire vulcanization method according to an embodiment of the present technology includes: attaching segments respectively to an outer circumferential surface of each of a plurality of sector molds disposed in an annular shape; attaching an upper plate to an upper surface of an upper side mold; attaching a lower plate to a lower surface of a lower side mold; disposing a container ring on an outer circumferential side of the segments; disposing, above the upper plate, a bolster plate to which the container ring is connected; mounting a green tire onto the lower side mold in a sideways state; assembling the sector molds in an annular shape between the upper plate and the lower plate by moving downward, by a pressurizing mechanism, the bolster plate in a standby position to a mold closed position, and closing the sector molds with the sector molds vertically sandwiched between the upper side mold and the lower side mold to put the green tire inside; and vulcanizing the green tire by applying pressure and heat to the green tire. In a state where the bolster plate is moved downward from the standby position and held in the mold closed position by connecting the bolster plate and the container ring with a connecting body interposed between the bolster plate and the container ring and allowing the container ring to be held slidably, by the connecting body, in a vertical direction with respect to the bolster plate, by moving the container ring downward with respect to the bolster plate by pressurizing fluid supplied from a fluid supply unit, the sector molds are assembled in an annular shape to be closed with the upper side mold pressed against upper surfaces of the sector molds.

According to an embodiment of the present technology, by moving the bolster plate downward by using the pressurizing mechanism and maintaining the bolster plate in the mold closed position, the sector molds, the upper side mold, and the lower side mold are substantially closed. Additionally, by moving the container ring alone, which is held by the connecting body slidably in the vertical direction with respect to the bolster plate, downward with respect to the bolster plate by using the pressurizing fluid, the sector molds are assembled in an annular shape and closed with the upper side mold pressed against the upper surfaces of the sector molds. As a result, in a state where the sector molds are pressed against the upper side mold and the lower side mold and sandwiched therebetween with the bolster plate maintained in the mold closed position, even in a case where there may be a gap between the adjacent sector molds in the circumferential direction, by moving the container ring alone further downward, the sector molds can be assembled in an annular shape without the gap. At this time, since a vertical position of the bolster plate is maintained in the mold closed position, the molds can reliably be in the closed state. Accordingly, differences of the finish of both side portions of a tire rarely occur in a vulcanization step, and the tire having excellent quality can be manufactured.

DETAILED DESCRIPTION

Figure 1:
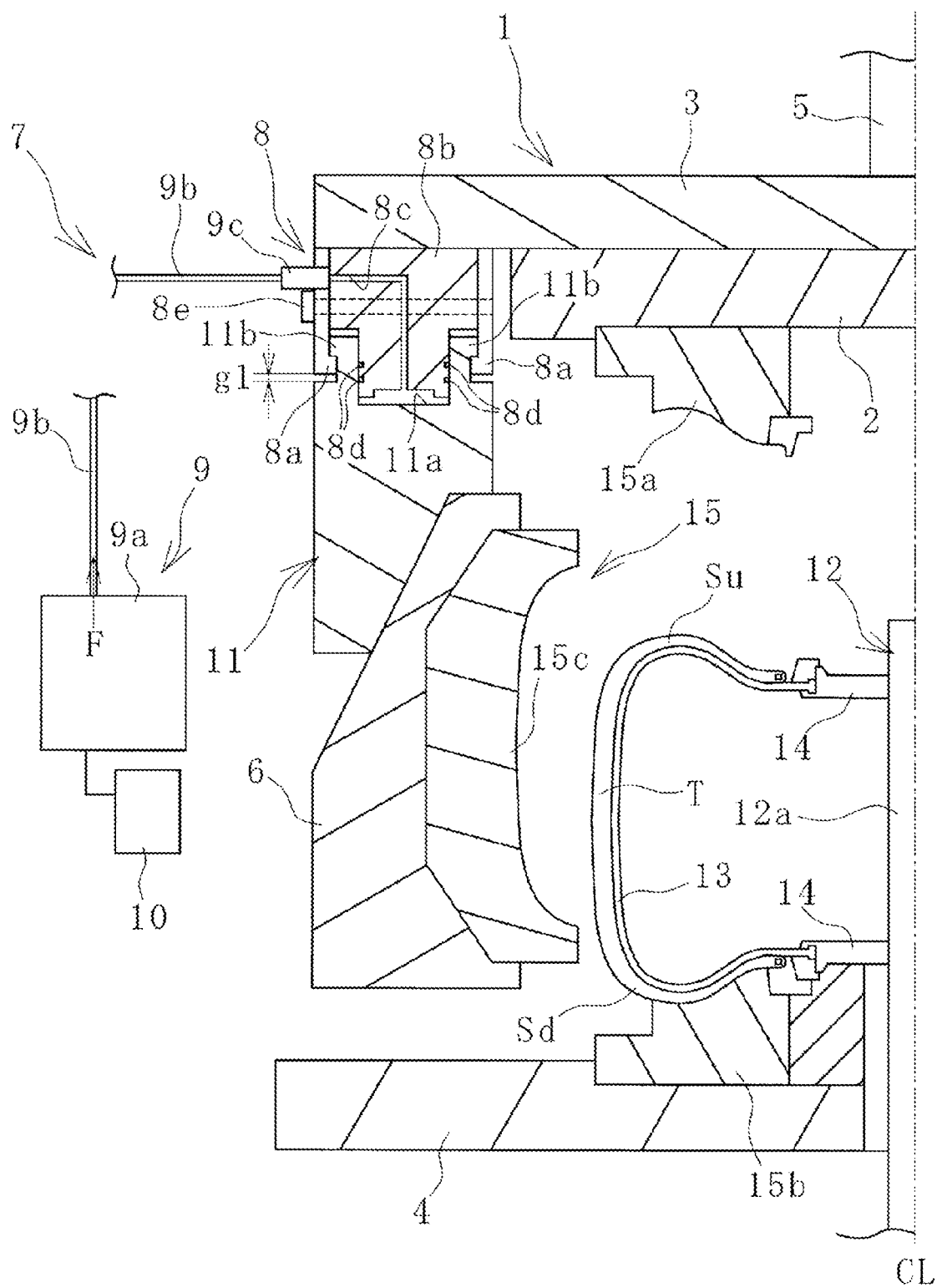
FIG. 1 is an explanatory diagram illustrating, in a longitudinal cross-sectional view, the left half of a tire vulcanization device according to an embodiment of the present technology in a mold opened state.

Hereinafter, a tire vulcanization device and a tire vulcanization method of the present technology will be described based on an embodiment illustrated in the drawings.

A tire vulcanization device 1 (hereinafter referred to as a vulcanization device 1) according to an embodiment of the present technology illustrated in FIGS. 1 to 3 includes a plurality of segments 6, an upper plate 2, a lower plate 4, a container ring 11, a bolster plate 3 connected to the container ring 11, a pressurizing mechanism 5 configured to move up and down the bolster plate 3, and a center mechanism 12 disposed in the center portion in a plan view of the lower plate 4. Further, the vulcanization device 1 includes an up down sliding mechanism 7 that can operate separately from the pressurizing mechanism 5 to slide the container ring 11 alone in the vertical direction with respect to the bolster plate 3.

A tire vulcanization mold 15 (hereinafter referred to as a mold 15) is attached to the vulcanization device 1. The mold 15 includes an annular upper side mold 15a, an annular lower side mold 15b, and a plurality of sector molds 15c. A green tire T is disposed inside the mold 15 and mounted on the lower side mold 15b in a sideways state. FIGS. 1 and 3 illustrate the mold 15 in an opened state.

A center post 12a constituting the center mechanism 12 is disposed at the center CL of the upper side mold 15a and the lower side mold 15b. Disc-shaped clamp portions 14 are attached at vertical intervals to the center post 12a. An upper end portion and a lower end portion of a cylindrical vulcanization bladder 13 are held by the respective clamp portions 14.

An upper surface of the upper side mold 15a is attached to the upper plate 2 while facing a lower surface of the upper plate 2. The upper side mold 15a is configured such that an upper side portion Su of the green tire T in a sideways state is vulcanization molded by a lower surface of the upper side mold 15a. The upper plate 2 moves up and down together with the upper side mold 15a.

A lower surface of the lower side mold 15b is attached to the lower plate 4 while facing an upper surface of the lower plate 4. The lower side mold 15b is configured such that a lower side portion Sd of the green tire T in a sideways state is vulcanization molded by an upper surface of the lower side mold 15b. The lower plate 4 is fixed in a stationary manner to the ground base.

The segments 6 are arranged in an annular shape around the center mechanism 12 (the center CL). An outer circumferential surface of the sector mold 15c is attached to an inner circumferential side of each of the segments 6 while facing the inner circumferential side of the segment 6. The outer circumferential surface of each of the segments 6 has an inclination that inclines upward from the outer circumferential side toward the inner circumferential side. The sector mold 15c is configured such that a tread portion of the green tire T in a sideways state is vulcanization molded by an inner circumferential surface of the sector mold 15c.

The annular container ring 11 is an annular body about the center mechanism 12 (the center CL) and moves up and down on the outer circumferential side of the segments 6 arranged in an annular shape. The container ring 11 moves up and down, and thus the inner circumferential inclined surface of the container ring 11 and the outer circumferential inclined surface of each of the segments 6 slide in contact with each other. Then, the outer circumferential surface of each of the segments 6 is pressed by the inner circumferential surface of the container ring 11 moving downward, and thus each of the sector molds 15c moves close to the annular center CL together with the segment 6.

The bolster plate 3 is disposed above the upper plate 2 and is connected via a connecting body 8 described below to an upper end portion of the container ring 11. The pressurizing mechanism 5 is connected to an upper surface of the bolster plate 3. A cylinder mechanism such as a hydraulic cylinder can be used as the pressurizing mechanism 5. Advance/retract movement of a cylinder rod of the pressurizing mechanism 5 in the vertical direction allows the bolster plate 3 to move up and down.

In the present embodiment, the up down sliding mechanism 7 includes the connecting body 8 interposed between the bolster plate 3 and the container ring 11, a fluid supply unit 9 configured to supply pressurizing fluid F, and a control unit 10 (i.e., regulator) configured to regulate a supply pressure of the pressurizing fluid F. The fluid supply unit 9 includes a supply source 9a including a storage 15 tank for the pressurizing fluid F and a pumping driving mechanism, a supply line 9b extending from the supply source 9a, and a detachable portion 9c attached to a tip end of the supply line 9b. Various types of liquid such as hydraulic oil and water and various types of gas such as air can be used as the pressurizing fluid F, but a liquid that is non-compressible may be used. It is 20 convenient to use the pressurizing fluid F flowing through a hydraulic pipe or an air pressure pipe that is provided preliminarily in the vulcanization device 1.

The connecting body 8 includes an outer circumferential side engagement portion 8a and an inner circumferential side engagement portion 8a that protrude downward from a lower surface of the bolster plate 3, and an annular distance ring 8b protruding downward between the engagement portions 8a. The outer circumferential side engagement portion 8a and the inner circumferential side engagement portion 8a are disposed at four locations equally separated in the circumferential direction of the bolster plate 3. Each of the engagement portions 8a, 8a and the distance ring 8b are connected by a fixture 8e such as a bolt that extends through the outer circumferential side engagement portion 8a, the distance ring 8b, and the inner circumferential side engagement portion 8a to communicate therewith. The engagement portions 8a, 8a are disposed at four locations but not limited thereto, and are disposed, for example, at three or more locations. A lower end portion of the distance ring 8b is an annular protrusion, and the seal ring 8d extends in the circumferential direction on side surfaces of the annular protrusion.

In addition, a flow path 8c through which the pressurizing fluid F flows is formed inside the distance ring 8b. The flow path 8c extends in an annular shape along the distance ring 8b as illustrated in FIG. 2, and opens to a lower end surface of the distance ring 8b at a plurality of locations separated in the circumferential direction (at four locations, equal intervals of 90° in the circumferential direction in the present embodiment) as illustrated in FIG. 1. The detachable portion 9c is detachably attached to an opening of the flow path 8c on an outer circumferential surface of the distance ring 8b. The detachable portion 9c is mounted to the opening, and thus the supply line 9b and the flow path 8c are brought into communication. The detachable portion 9c is mounted to the opening of the flow path 8c on the outer circumferential surface of the connecting body 8 when necessary, and does not need to be consistently mounted to the opening.

An annular groove portion 11a continuous entirely in the circumferential direction and engagement portions 11b protruding upward are formed on an upper surface of the container ring 11. An annular protrusion forming the lower end portion of the distance ring 8b is fit into the annular groove portion 11a. The annular protrusion is fit into the annular groove portion 11a, and thus an annular space having high airtightness (water tightness) and communicating with the flow path 8c is formed between a lower surface of the annular protrusion of the distance ring 8b and a bottom surface of the annular groove portion 11a of the container ring 11. Note that the seal ring 8d can be provided on side surfaces of the annular groove portion 11a.

The inner circumferential side engagement portion 11b and the outer circumferential side engagement portion 11b of the container ring 11 respectively engage with the corresponding engagement portions 8a, 8a of the connecting body 8. As a result, the distance ring 8b and the container ring 11 are vertically slidably connected by the respective engagement portions 8a, 8a. In other words, the container ring 11 is held by the connecting body 8 slidably in the vertical direction with respect to the bolster plate 3. In the mold opened state illustrated in FIG. 1, the container ring 11 is suspended, under its own weight, by the connecting body 8 while having a predetermined maximum gap g1 in the vertical direction with respect to the connecting body 8. As a result, the container ring 11 is held slidably upward while being restricted from sliding downward with respect to the bolster plate 3.

When the pressurizing fluid F is supplied by the fluid supply unit 9 through the supply line 9b to the flow path 8c of the connecting body 8, the supplied pressurizing fluid F accumulates between the lower surface of the annular protrusion of the distance ring 8b and the bottom surface of the annular groove portion 11a of the container ring 11. In a case where the container ring 11 has a gap in the vertical direction with respect to the connecting body 8 that is smaller than the maximum gap g1 or where the container ring 11 is held by the connecting body 8 without a gap, the container ring 11 is moved downward with respect to the connecting body 8 (the bolster plate 3) by pressure generated by the supplied pressurizing fluid F. By reducing the pressure (supply pressure) generated by the pressurizing fluid F or by releasing the pressure to the atmosphere, the container ring 11 moved downward moves upward.

Next, an example of a method of manufacturing a pneumatic tire by vulcanizing the green tire T using this vulcanization device 1 will be described.

Figure 2:
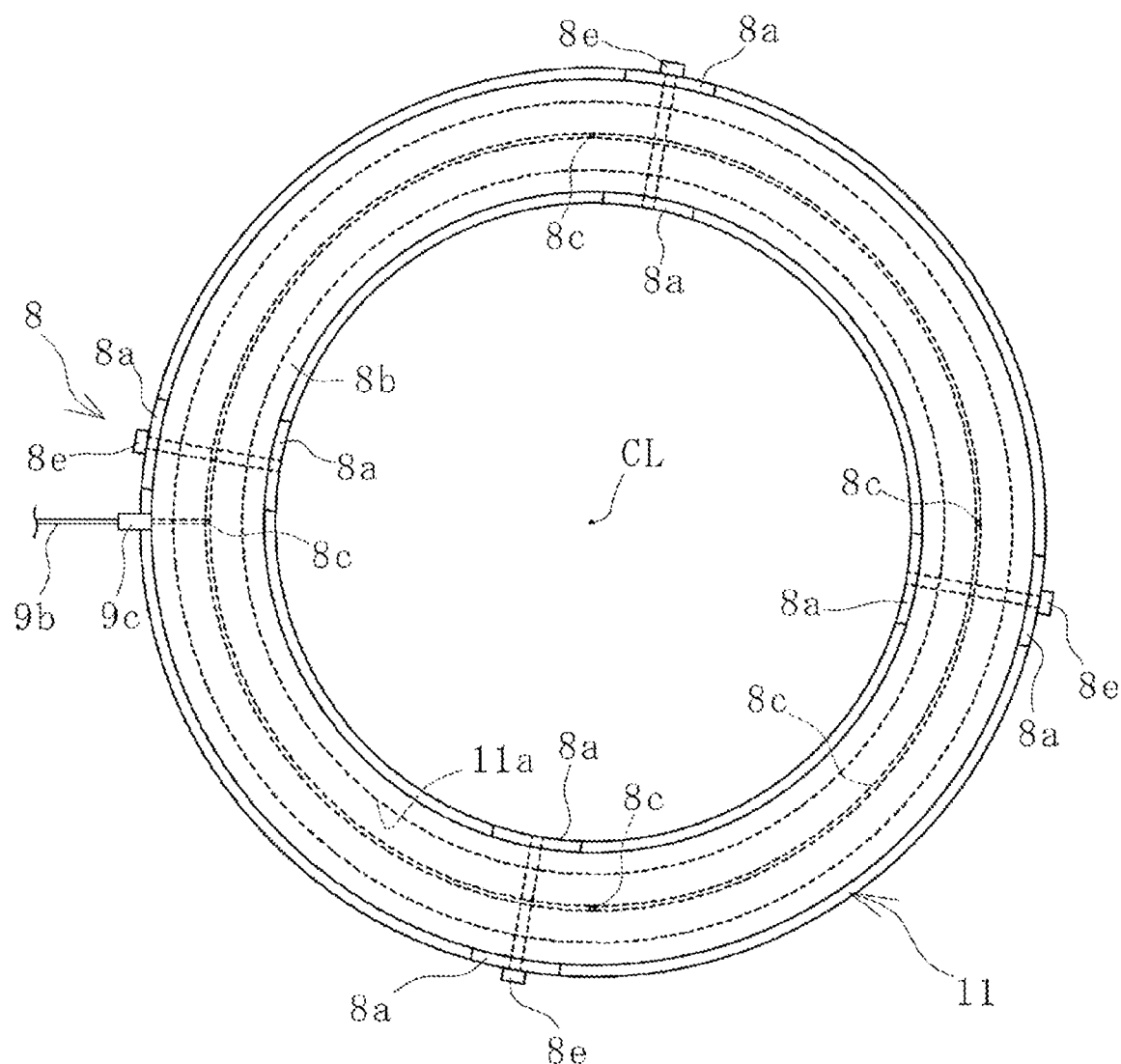
FIG. 2 is an explanatory diagram illustrating a connecting body and a container ring of FIG. 1 in a plan view.
Figure 3:
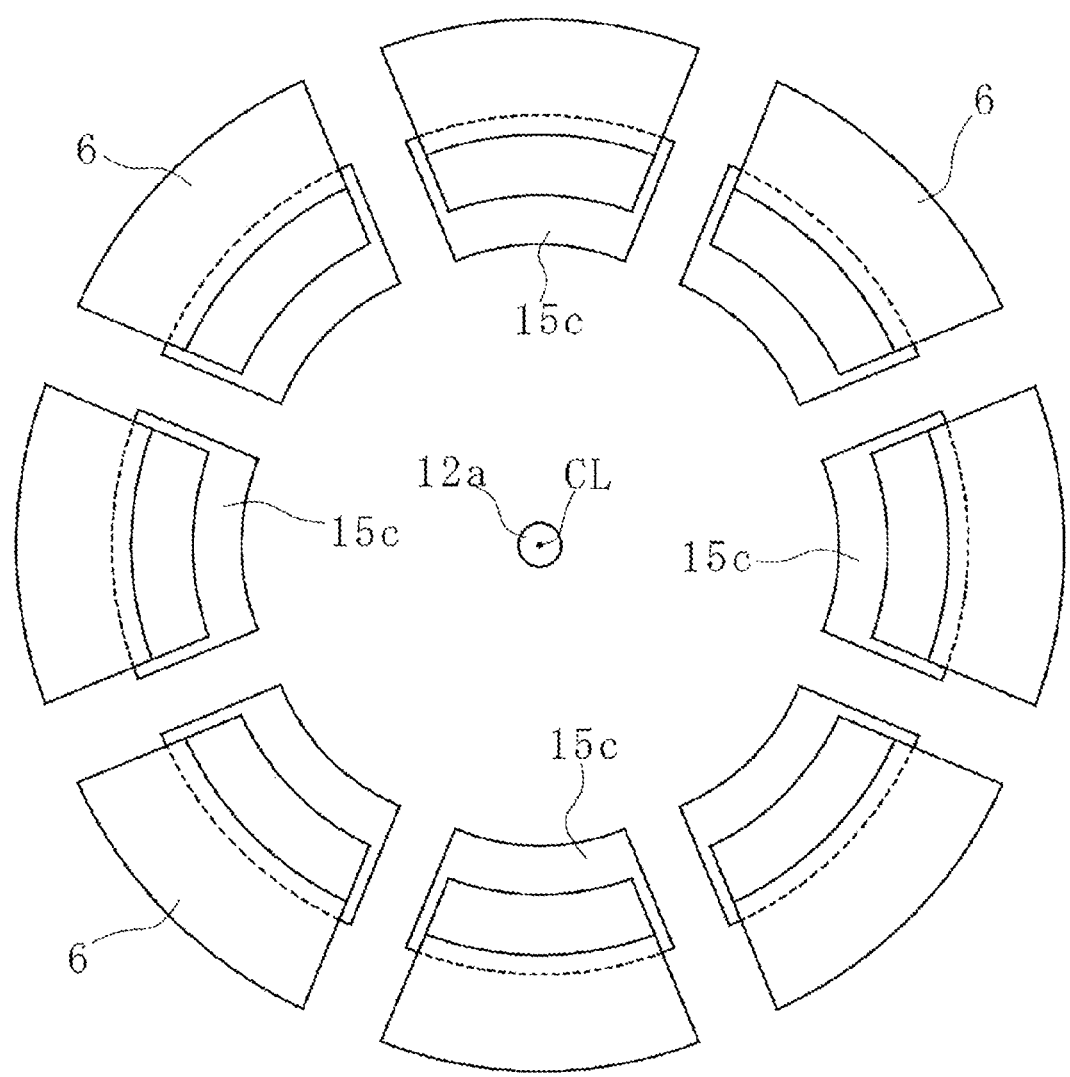
FIG. 3 is an explanatory diagram illustrating sector molds and segments of FIG. 1 in a plan view.

In vulcanizing the green tire T, as illustrated in FIGS. 1 and 3, the green tire T in a sideways state is inserted through the center mechanism 12 with the mold 15 opened, and the green tire T is held by the vulcanization bladder 13 inflated by shaping pressure. The green tire T is mounted on the lower side mold 15b. At this time, the bolster plate 3 is in a standby position, and as described above, the container ring 11 is suspended by the connecting body 8 while having the predetermined gap g1 in the vertical direction with respect to the connecting body 8.

Figure 4:
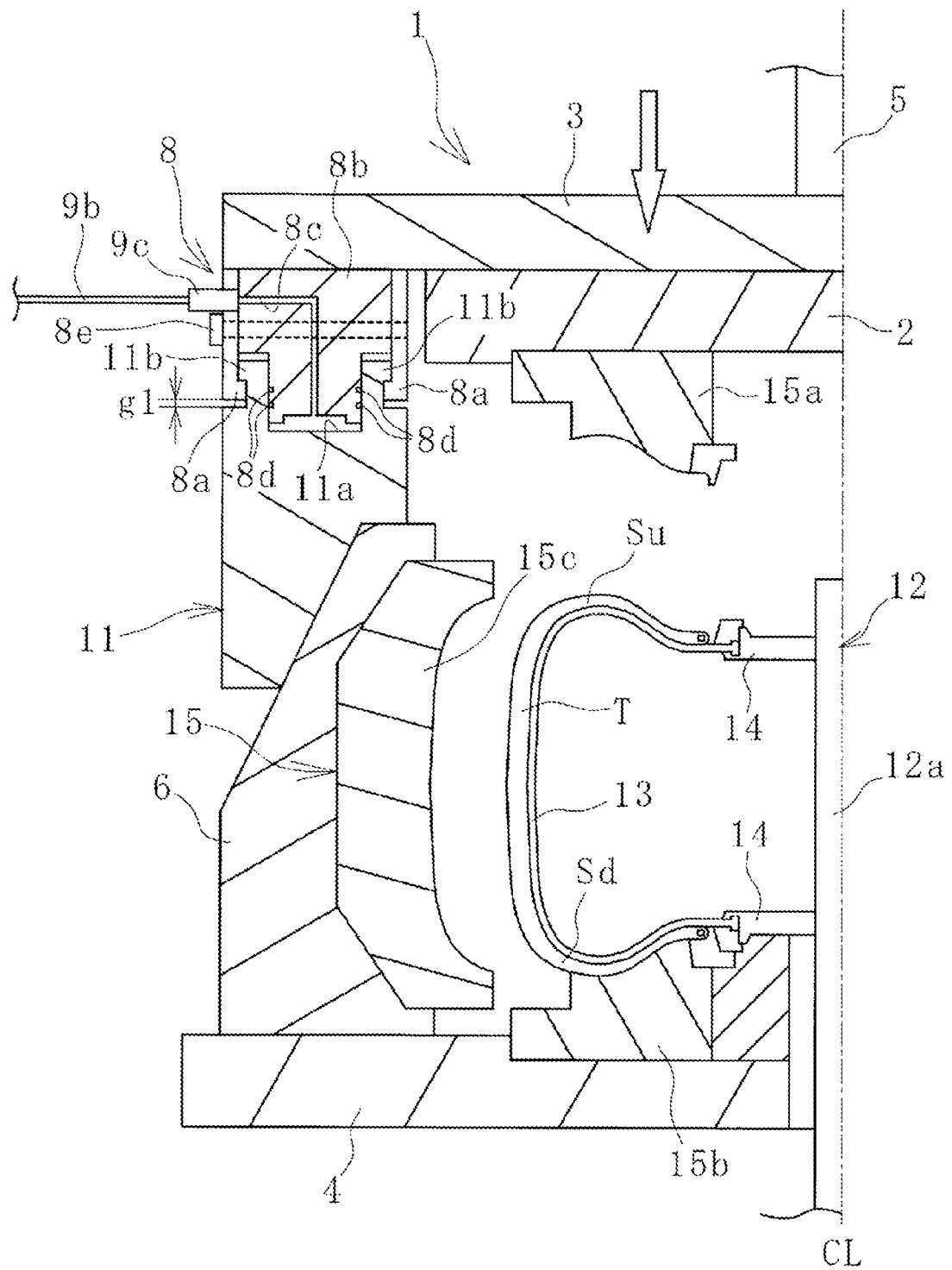
FIG. 4 is an explanatory diagram illustrating, in a longitudinal cross-sectional view, a state where a bolster plate of FIG. 1 is moved downward and each of the segments is placed on a lower plate.

Next, as illustrated in FIG. 4, the bolster plate 3 is moved downward by the pressurizing mechanism 5, and thus the upper plate 2, the upper side mold 15a, the connecting body 8, and the container ring 11 are integrally moved downward. Accordingly, the segments 6 are mounted on the lower plate 4. In this step, the predetermined gap g1 in the vertical direction between the connecting body 8 and the container ring 11 is maintained.

Figure 5:
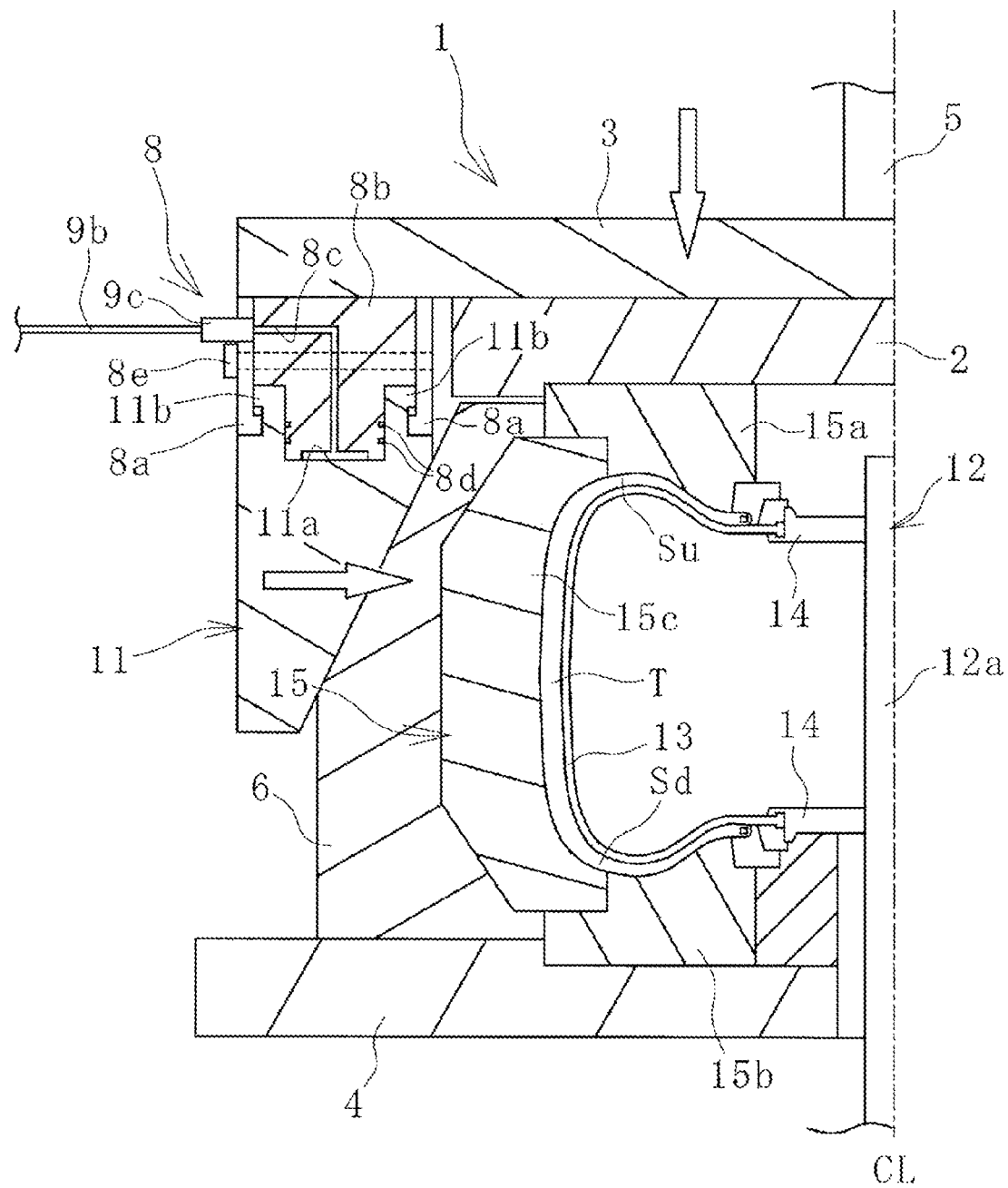
FIG. 5 is an explanatory diagram illustrating, in a longitudinal cross-sectional view, a state where the bolster plate of FIG. 4 is moved further downward to a mold closed position.

Next, as illustrated in FIG. 5, the bolster plate 3 is moved further downward by the pressurizing mechanism 5 to a mold closed position. In this step, the outer circumferential inclined surface of each of the segments 6 is pressed by the inner circumferential inclined surface of the container ring 11 moving downward, and each of the sector molds 15c is moved toward the center CL together with each of the segments 6.

In addition, since the upper plate 2 and the upper side mold 15a integrally move downward together with the bolster plate 3, the upper side mold 15a presses an upper surface of each of the sector mold 15c moved toward the center CL. As a result, the sector molds 15c are assembled substantially in an annular shape vertically between the upper plate 2 and the lower plate 4 and vertically sandwiched by the upper side mold 15a and the lower side mold 15b, and the mold 15 is substantially closed with the green tire T contained therein.

When the bolster plate 3 is in the mold closed position, the upper surface of each of the sector molds 15c is pressed by the upper side mold 15a, and each sector mold 15c is in pressure contact with the upper side mold 15a and the lower side mold 15b. The vertical position of the bolster plate 3 is maintained in the mold closed position.

The container ring 11 pressed against the outer circumferential inclined surface of each of the segments 6 is sandwiched between the bolster plate 3 (connecting body 8) and the segments 6 and thus moves upward with respect to the bolster plate 3 (connecting body 8). The upward movement of the container ring 11 eliminates the gap g1 in the vertical direction between the container ring 11 and the connecting body 8. As a result, when the bolster plate 3 is in the mold closed position, the container ring 11 is restricted from sliding upward with respect to the bolster plate 3 (connecting body 8) and is held slidably downward by the connecting body 8.

Figure 6:
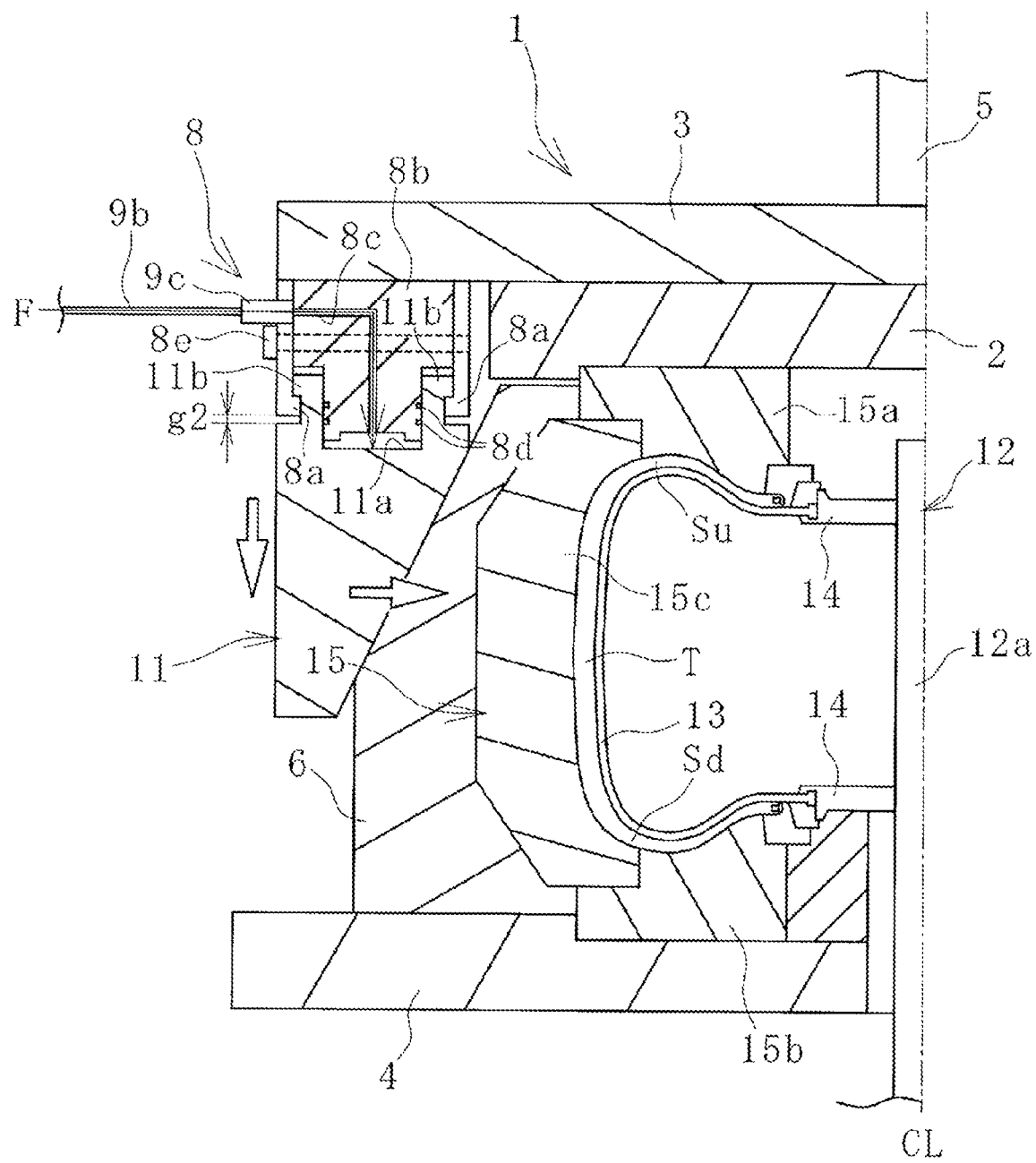
FIG. 6 is an explanatory diagram illustrating, in a longitudinal cross-sectional view, a state where the container ring is moved further downward and the molds are closed.

In this state, the sector molds 15*c*, the upper side mold 15*a*, and the lower side mold 15*b* are sufficiently pressed; however, the sector molds 15*c* adjacent to each other in the circumferential direction may not be firmly assembled without a gap. Accordingly, as illustrated in FIG. 6, the pressurizing fluid F is supplied from the fluid supply unit 9 to the flow path 8*c* of the connecting body 8 in a state where the bolster plate 3 is maintained in the mold closed position. The container ring 11 is moved downward alone with respect to the bolster plate 3 (connecting body 8) by the pressure of the supplied pressurizing fluid F. In FIG. 6, the container ring 11 moves downward with respect to the bolster plate 3 (connecting body 8), and thus a gap g2 occurs between the container ring 11 and the connecting body 8 in the vertical direction (gap g2<gap g1).

In accordance with the downward movement of the container ring 11, the segments 6 (sector molds 15*c*) are pressed toward the center CL, and the sector molds 15*c* are firmly assembled in an annular shape. In other words, the sector molds 15*c* assembled in an annular shape are further tightened by using the up down sliding mechanism 7. Accordingly, the sector molds 15*c* are firmly assembled in an annular shape to be closed with the upper side mold 15*a* pressed against the upper surface of each of the sector molds 15*c*.

With the mold closed state maintained, inside the closed mold 15, the vulcanization bladder 13 is further inflated inside the green tire T to apply predetermined internal pressure to the green tire T, and the green tire T is heated and vulcanized at a predetermined temperature. A pneumatic tire is obtained by vulcanizing the green tire T for a predetermined time.

During vulcanization of the green tire T, the force that attempts to open the mold 15 acts from the inner side of the closed mold 15, but the force to open the mold is counteracted by mold closing force generated by the pressurizing mechanism 5 and the up down sliding mechanism 7. The amount of downward movement (size of the gap g2) of the container ring 11 with respect to the bolster plate 3 (connecting body 8) can be adjusted by regulating the supply pressure of the pressurizing fluid F by the control unit 10. Accordingly, the supply pressure of the pressurizing fluid F may be regulated in an appropriate range based on the pre-grasped vulcanization conditions or the like of the green tire T to be vulcanized.

Figure 7:
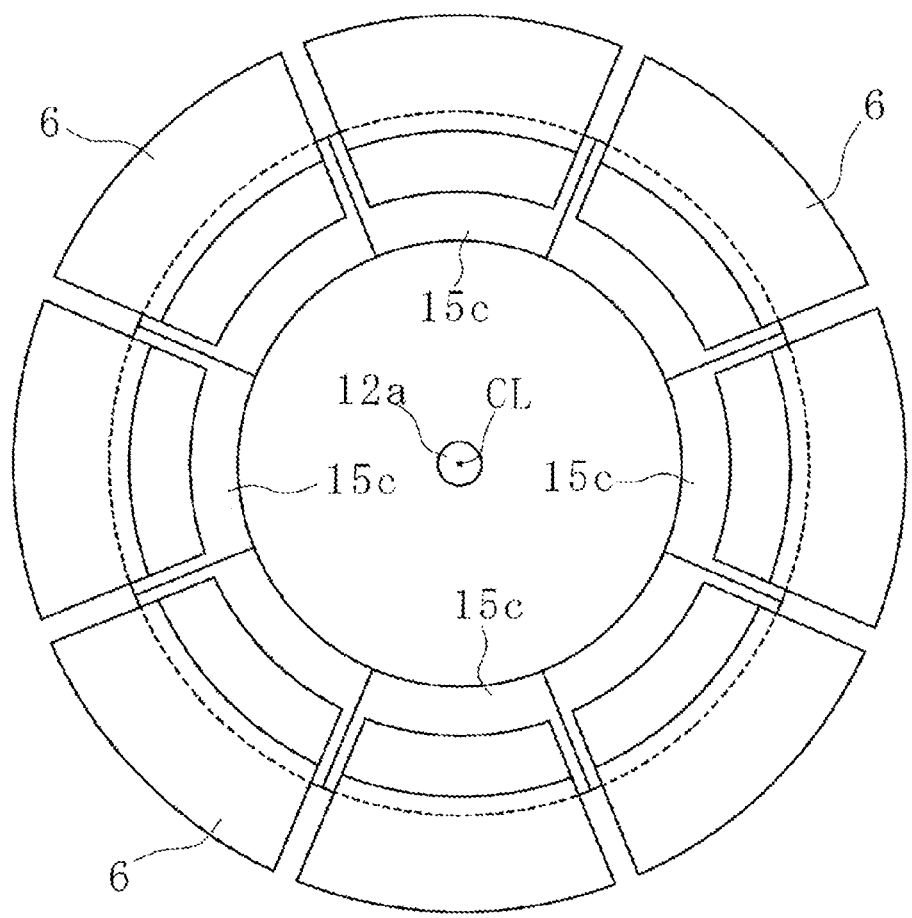
FIG. 7 is an explanatory diagram illustrating the sector molds and the segments of FIG. 6 in a plan view.

Even in a case where there is a gap between the sector molds 15*c* adjacent to each other in the circumferential direction when the bolster plate 3 is moved downward to a mold closed position by using the pressurizing mechanism 5 to substantially close the mold 15 as just described, by moving the container ring 11 alone downward by using the up down sliding mechanism 7, the sector molds 15*c* can be firmly assembled in an annular shape without the gap. In addition, even when the sector molds 15*c* are pressed toward the center CL by using the up down sliding mechanism 7, the vertical position of the bolster plate 3 is maintained in the mold closed position. Accordingly, a close contact state between the sector molds 15*c* and the upper side mold 15*a* and between the sector molds 15*c* and the lower side mold 15*b* is maintained. Thus, as illustrated in FIG. 7, the mold 15 can reliably be in the closed state during vulcanization.

As a result, a defect such that a step is formed due to a failure of the upper side portion Su of the manufactured tire can be avoided. That is, a difference in the finish of both side portions of the tire rarely occurs during the vulcanization step, and a tire having excellent quality can be manufactured. In addition, the formation of unnecessary rubber membranes due to the outflow of rubber from gaps between the sector molds 15*c* can also be suppressed, and thus appearance quality of the tire can be improved.

Since the configuration is provided where the pressurizing fluid F is used in moving the container ring 11 alone downward with respect to the bolster plate 3 (connecting body 8), the pressurizing fluid F may be supplied to the flow path 8*c* when necessary. As a result, an unnecessary load is not consistently applied to the container ring 11, the connecting body 8, the bolster plate 3, and other components, which advantageously prevents deformation, wear, or the like of components. In addition, by simply adjusting the supply pressure of the pressurizing fluid F, the amount of downward movement of the container ring 11, that is, more tightening force with respect to the sector molds 15*c* to be assembled in an annular shape can be changed, and advantageously, the degree of change can be widely extended. The mold closing force can be appropriately set by the pressurizing mechanism 5 and the up down sliding mechanism 7 in a balanced manner, and thus advantageously, the mold 15 is reliably maintained in the closed state. On the other hand, in a configuration where the container ring 11 is moved downward alone with respect to the bolster plate 3 (connecting body 8) by using a biasing force of a spring or the like, the aforementioned advantage from using the pressurizing fluid F cannot be obtained.

The up down sliding mechanism 7 is not limited to the embodiment described above. Various configurations can be used as the up down sliding mechanism 7, where the container ring 11 can be moved downward alone with respect to the bolster plate 3 by the pressurizing fluid F in a state where the container ring 11 is held slidably in the vertical direction with respect to the bolster plate 3 and the vertical position of the bolster plate 3 is maintained in the mold closed position.

In the present embodiment, the supply line 9*b* through which the pressurizing fluid F is supplied is connected at one location to the connecting body 8; however, the supply line 9*b* can be connected at a plurality of locations separated in the circumferential direction of the connecting body 8. This makes it easier to apply the force, pressing the annular container ring 11 by the pressurizing fluid F, evenly in the circumferential direction. As in the embodiment, in a case where the supply line 9*b* is configured to be connected at one location to the connecting body 8, attaching/detaching operation of the detachable portion 9*c* is performed only at one location, and thus the operation is simplified. The supply source 9*a* is not limited to a single source, and the pressurizing fluid F can be supplied from a plurality of supply sources 9*a* to the flow path 8*c*.

The invention claimed is:

1. A tire vulcanization device, comprising:
   segments respectively attached to an outer circumferential surface of each of a plurality of sector molds disposed in an annular shape;
   an upper plate attached to an upper surface of an upper side mold;
   a lower plate attached to a lower surface of a lower side mold;
   a container ring disposed on an outer circumferential side of the segments;
   a bolster plate disposed above the upper plate and connected to the container ring;

a pressurizing mechanism configured to move the bolster plate up and down, the upper plate and the upper side mold moving up and down together with the bolster plate, wherein by moving the bolster plate downward, the sector molds being assembled in an annular shape between the upper plate and the lower plate, and the sector molds being closed while being vertically sandwiched between the upper side mold and the lower side mold, wherein a first portion of downward movement of the bolster plate moves the sector molds downward, and a second portion of the downward movement of the bolster plate does not move the sector molds downward, the second portion of the downward movement of the bolster plate causing lateral movement of the sector molds;

a connecting body interposed between the bolster plate and the container ring to connect the bolster plate and the container ring; and a fluid supply line configured to supply a pressurizing fluid, in a state where the container ring is held slidably in a vertical direction with respect to the bolster plate by the connecting body and a vertical position of the bolster plate is maintained in a mold closed position, by moving the container ring downward with respect to the bolster plate by the pressurizing fluid supplied by the fluid supply line, the sector molds being assembled in an annular shape to be closed with the upper side mold pressed against upper surfaces of the sector molds.

2. The tire vulcanization device according to claim 1, comprising a regulator configured to regulate a supply pressure of the pressurizing fluid.

3. The tire vulcanization device according to claim 1, wherein, when the bolster plate is in a standby position above the mold closed position, the container ring is suspended by the connecting body and is restricted from sliding downward with respect to the bolster plate and held slidably upward, and, before the pressurizing fluid is supplied in a state where the bolster plate is maintained in the mold closed position, the container ring is restricted from sliding upward with respect to the bolster plate and held slidably downward.

4. The tire vulcanization device according to claim 1, wherein supply lines configured to supply the pressurizing fluid are connected to the connecting body at a plurality of locations separated in a circumferential direction.

5. The tire vulcanization device according to claim 2, wherein, when the bolster plate is in a standby position above the mold closed position, the container ring is suspended by the connecting body and is restricted from sliding downward with respect to the bolster plate and held slidably upward, and, before the pressurizing fluid is supplied in a state where the bolster plate is maintained in the mold closed position, the container ring is restricted from sliding upward with respect to the bolster plate and held slidably downward.

6. The tire vulcanization device according to claim 5, wherein supply lines configured to supply the pressurizing fluid are connected to the connecting body at a plurality of locations separated in a circumferential direction.

7. The tire vulcanization device according to claim 1, wherein each of the sector molds is a vertically non-split type.

8. A tire vulcanization method, comprising:
attaching segments respectively to an outer circumferential surface of each of a plurality of sector molds disposed in an annular shape;
attaching an upper plate to an upper surface of an upper side mold;
attaching a lower plate to a lower surface of a lower side mold;
disposing a container ring on an outer circumferential side of the segments;
disposing, above the upper plate, a bolster plate to which the container ring is connected;
mounting a green tire onto the lower side mold in a sideways state;
assembling the sector molds in an annular shape between the upper plate and the lower plate by moving downward, by a pressurizing mechanism, the bolster plate in a standby position to a mold closed position, and closing the sector molds with the sector molds vertically sandwiched between the upper side mold and the lower side mold to enclose the green tire inside, wherein a first portion of downward movement of the bolster plate moves the sector molds downward, and a second portion of the downward movement of the bolster plate does not move the sector molds downward, the second portion of the downward movement of the bolster plate causing lateral movement of the sector molds toward the green tire; and
vulcanizing the green tire by applying pressure and heat to the green tire,
in a state where the bolster plate is moved downward from the standby position and held in the mold closed position by connecting the bolster plate and the container ring with a connecting body interposed between the bolster plate and the container ring and allowing the container ring to be held slidably, by the connecting body, in a vertical direction with respect to the bolster plate, by moving the container ring downward with respect to the bolster plate by pressurizing fluid supplied from a fluid supply line, the sector molds being assembled in an annular shape to be closed with the upper side mold pressed against upper surfaces of the sector molds;
wherein the upper plate and the upper side mold move up and down together with movement of the bolster plate up and down.

9. The tire vulcanization method according to claim 8, wherein each of the sector molds is a vertically non-split type.

10. A tire vulcanization device, comprising:
segments respectively attached to an outer circumferential surface of each of a plurality of sector molds disposed in an annular shape;
an upper plate attached to an upper surface of an upper side mold;
a lower plate attached to a lower surface of a lower side mold;
a container ring disposed on an outer circumferential side of the segments;
a bolster plate disposed above the upper plate and connected to the container ring;
a pressurizing mechanism configured to move the bolster plate up and down, wherein by moving the bolster plate downward, the sector molds being assembled in an annular shape between the upper plate and the lower plate, and the sector molds being closed while being vertically sandwiched between the upper side mold and the lower side mold, wherein a first portion of downward movement of the bolster plate moves the sector molds downward, and a second portion of the downward movement of the bolster plate does not move the sector molds downward, the second portion of the downward movement of the bolster plate causing lateral movement of the sector molds;

a connecting body interposed between the bolster plate and the container ring to connect the bolster plate and the container ring;

a fluid supply line configured to supply a pressurizing fluid, and a detachable portion attached to a tip end of the fluid supply line, the detachable portion being detachably attached to the connecting body, in a state where the container ring is held slidably in a vertical direction with respect to the bolster plate by the connecting body and a vertical position of the bolster plate is maintained in a mold closed position, by moving the container ring downward with respect to the bolster plate by the pressurizing fluid supplied by the fluid supply line, the sector molds being assembled in an annular shape to be closed with the upper side mold pressed against upper surfaces of the sector molds.

11. A tire vulcanization method, comprising:

attaching segments respectively to an outer circumferential surface of each of a plurality of sector molds disposed in an annular shape;

attaching an upper plate to an upper surface of an upper side mold;

attaching a lower plate to a lower surface of a lower side mold;

disposing a container ring on an outer circumferential side of the segments;

disposing, above the upper plate, a bolster plate to which the container ring is connected;

mounting a green tire onto the lower side mold in a sideways state;

assembling the sector molds in an annular shape between the upper plate and the lower plate by moving downward, by a pressurizing mechanism, the bolster plate in a standby position to a mold closed position, and closing the sector molds with the sector molds vertically sandwiched between the upper side mold and the lower side mold to enclose the green tire inside, wherein a first portion of downward movement of the bolster plate moves the sector molds downward, and a second portion of the downward movement of the bolster plate does not move the sector molds downward, the second portion of the downward movement of the bolster plate causing lateral movement of the sector molds toward the green tire; and vulcanizing the green tire by applying pressure and heat to the green tire, in a state where the bolster plate is moved downward from the standby position and held in the mold closed position by connecting the bolster plate and the container ring with a connecting body interposed between the bolster plate and the container ring and allowing the container ring to be held slidably, by the connecting body, in a vertical direction with respect to the bolster plate, by moving the container ring downward with respect to the bolster plate by pressurizing fluid supplied from a fluid supply line, the sector molds being assembled in an annular shape to be closed with the upper side mold pressed against upper surfaces of the sector molds, and by attaching a detachable portion to a tip end of the fluid supply line, the detachable portion being detachable attached to the connecting body.

* * * * *